(12) United States Patent
Moriyama et al.

(10) Patent No.: US 11,932,090 B2
(45) Date of Patent: Mar. 19, 2024

(54) EXTERIOR PANEL STRUCTURE FOR VEHICLE

(71) Applicant: MAZDA MOTOR CORPORATION, Hiroshima (JP)

(72) Inventors: Yukihiro Moriyama, Aki-gun (JP); Eisuke Kuramoto, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 0 days.

(21) Appl. No.: 17/931,004

(22) Filed: Sep. 9, 2022

(65) Prior Publication Data

US 2023/0108393 A1 Apr. 6, 2023

(30) Foreign Application Priority Data

Oct. 1, 2021 (JP) .................................. 2021-162513

(51) Int. Cl.
*B60J 5/04* (2006.01)

(52) U.S. Cl.
CPC ........... *B60J 5/0415* (2013.01); *B60J 5/0441* (2013.01)

(58) Field of Classification Search
None
See application file for complete search history.

(56) References Cited

U.S. PATENT DOCUMENTS

| 11,639,087 B2* | 5/2023 | Suzuki ................... B60J 5/0426 296/146.6 |
| 2012/0056445 A1* | 3/2012 | Golovashchenko ... B62D 25/16 29/897.2 |
| 2021/0122216 A1 | 4/2021 | Suzuki et al. |

FOREIGN PATENT DOCUMENTS

JP 6493615 B1 * 4/2019 ............. B32B 15/08

* cited by examiner

*Primary Examiner* — Joseph D. Pape
(74) *Attorney, Agent, or Firm* — Studebaker & Brackett PC

(57) ABSTRACT

An exterior panel structure for a vehicle prevents unevenness of an outer surface of an exterior panel material caused by joining of a reinforcing member to the exterior panel. The reinforcing member is joined to the exterior panel material such that rigidity is maintained, thereby keeping dents in the exterior panel material small even when a user presses on the exterior panel material during waxing of the vehicle, or the like. The exterior panel structure includes a door outer panel, a reinforcing member, and a bracket. In the bracket, a joint surface which follows an inner surface of the door outer panel is joined to an outer peripheral edge of the door panel which is separated from the inner surface of the door outer panel in a thickness direction of the door outer panel, and another joint surface is joined to a reinforcing outer peripheral edge of the reinforcing member.

20 Claims, 8 Drawing Sheets

EXTERIOR PANEL STRUCTURE FOR VEHICLE

TECHNICAL FIELD

The present disclosure relates to an exterior panel structure for a vehicle and, in particular, to a joint structure between an exterior panel material and a reinforcing member that reinforces the exterior panel material.

BACKGROUND

Weight reduction has continuously been requested for a vehicle such as a passenger vehicle. As a measure thereof, an exterior panel material of the vehicle is thinned. Weight of the vehicle can be reduced by thinning the exterior panel material. However, when a user washes or waxes the vehicle, the exterior panel material is possibly dented, which is undesirable from a perspective of external appearance quality. To handle such a problem, a structure disclosed in International Patent Application WO 2019/146789 has been proposed.

In WO 2019/146789, an exterior panel structure that includes a door outer panel, plural first reinforcing members, and plural second reinforcing members is disclosed. Each of the plural first reinforcing members is a long member that extends in a vehicle front-rear direction, is curved along an inner surface of the door outer panel, and is joined to the inner surface of the door outer panel. Each of the plural second reinforcing members is a long member that extends in a vehicle up-down direction, is curved along the inner surface of the door outer panel, and is joined to the inner surface of the door outer panel.

It has been suggested that the exterior panel material can be reinforced by adopting the first reinforcing members and the second reinforcing members as described above and thus a dent in the exterior panel material can be kept small during washing and waxing of the vehicle, and the like.

SUMMARY

From a perspective of reinforcement to reduce the size of a dent in the exterior panel material, the reinforcing member has to be joined to the inner surface of the exterior panel material while support rigidity is maintained for the inner surface of the exterior panel material.

However, when it is attempted to adopt the structure disclosed in WO 2019/146789, an outer surface of the exterior panel material, which forms the external appearance of the vehicle, becomes uneven by joining the first reinforcing members and the second reinforcing members to the inner surface of the exterior panel material. Thus, degradation of external appearance quality occurs. That is, in the vehicle (particularly, a passenger automobile), the outer surface of the exterior panel material is configured to have a complex shape to improve aerodynamic characteristics and external appearance quality. Thus, it is difficult to cause the first reinforcing members and the second reinforcing members disclosed in WO 2019/146789 to adhere tightly and uniformly to the entire inner surface of the exterior panel material.

Accordingly, when it is attempted to adopt the structure disclosed in WO 2019/146789 for the exterior panel of the vehicle, the exterior panel material is partially pulled inward (toward the first reinforcing members and the second reinforcing members) and distorted by joining the first reinforcing members and the second reinforcing members to the exterior panel material. As a result, the outer surface of the exterior panel material, which forms the vehicle external appearance, becomes uneven.

The present disclosure has been made to solve the problem described above and therefore has a purpose of providing an exterior panel structure for a vehicle capable of preventing unevenness of an outer surface of an exterior panel material caused by joining of a reinforcing member to the exterior panel material, while enabling joining the reinforcing member to the exterior panel material such that support rigidity therefor is maintained and dents in the exterior panel material are kept small, even when a user presses the exterior panel material during waxing of the vehicle, and the like.

An exterior panel structure for a vehicle according to an aspect of the present disclosure includes an exterior panel material and a reinforcing member. The exterior panel material has an outer surface that partly constitutes the external appearance of a vehicle. The reinforcing member has a reinforcing surface that is disposed along an inner surface of the exterior panel material and reinforces the exterior panel material against a pressing force that is applied in a thickness direction of the exterior panel material.

In the exterior panel structure for a vehicle according to this aspect, the reinforcing surface of the reinforcing member has plural joint sections and a coupling section. The plural joint sections are separated from each other along the inner surface of the exterior panel material, and each thereof is joined to the inner surface of the exterior panel material. The coupling section extends to follow the inner surface of the exterior panel material and couples the adjacent joint sections. The reinforcing member further has a reinforcing outer peripheral edge that is provided to an outer peripheral edge of the reinforcing surface to follow the inner surface of the exterior panel material.

The inner surface of the exterior panel material and the coupling section are configured to be separated from each other with a gap being provided therebetween in the case where the pressing force is not applied inward in the thickness direction of the exterior panel material from the outer surface of the exterior panel material or the applied pressing force is smaller than a specified value; and abut each other in the case where the pressing force equal to or larger than the specified value is applied inward in the thickness direction of the exterior panel material from the outer surface of the exterior panel material.

The exterior panel structure for a vehicle according to this aspect further has a joint intermediate section that is disposed between a panel outer peripheral edge on the inner surface of the exterior panel material and the reinforcing outer peripheral edge of the reinforcing member and joins the panel outer peripheral edge and the reinforcing outer peripheral edge. The joint intermediate section has a higher rigidity than the reinforcing surface of the reinforcing member.

According to the exterior panel structure for a vehicle according to the above aspect, during a stationary time (a state where the pressing force is not applied or the applied pressing force is smaller than the specified value), only the plural joint sections on the reinforcing surface of the reinforcing member are joined to the inner surface of the exterior panel material, and the coupling section is not joined to the inner surface of the exterior panel material. Accordingly, in the exterior panel structure for a vehicle according to the above aspect, even in the case where the coupling section is not formed in a manner to accurately match an inner surface shape of the exterior panel material, the outer surface of the exterior panel material is unlikely to become uneven due to distortion.

In addition, in the exterior panel structure for a vehicle according to the above aspect, in the case where the pressing force equal to or larger than the specified value is applied to the outer surface of the exterior panel material, the coupling section of the reinforcing member and the inner surface of the exterior panel material abut each other. Accordingly, for example, also in the case where a user presses the outer surface of the exterior panel material with the pressing force equal to or larger than the specified value during waxing or washing of the vehicle, or the like, the coupling section of the reinforcing member abuts the inner surface of the exterior panel material, and thus the exterior panel material is prevented from being significantly dented. Therefore, the exterior panel structure for a vehicle according to the above aspect is superior from a perspective of external appearance quality of the vehicle.

In the exterior panel structure for a vehicle according to the above aspect, the panel outer peripheral edge of the exterior panel material and the reinforcing outer peripheral edge of the reinforcing member are joined with the joint intermediate section being held therebetween, and the joint intermediate section is formed to have a higher rigidity than the reinforcing surface of the reinforcing member. Therefore, in the exterior panel structure for a vehicle according to the above aspect, the reinforcing member can be joined to the inner surface of the exterior panel material with high support rigidity while the outer surface of the exterior panel material is prevented from becoming uneven due to the distortion.

In the exterior panel structure for a vehicle according to the above aspect, the joint intermediate section may be a different member from the exterior panel material and the reinforcing member and may be joined to each of the panel outer peripheral edge and the reinforcing outer peripheral edge.

In the exterior panel structure for a vehicle according to the above aspect, the joint intermediate section is configured as a different component from the exterior panel material and the reinforcing member. Therefore, the joint intermediate section can easily be formed to have high rigidity with respect to the reinforcing surface of the reinforcing member, which is advantageous for joining the reinforcing member to the inner surface of the exterior panel material with high support rigidity.

In the exterior panel structure for a vehicle according to the above aspect, the joint intermediate section may be formed of a material at least having a higher Young's modulus than the reinforcing surface of the reinforcing member.

In the exterior panel structure for a vehicle according to the above aspect, the joint intermediate section is formed by using a material at least having a higher Young's modulus than the reinforcing surface. Therefore, the reinforcing member can be joined to the inner surface of the exterior panel material with high support rigidity without thickening the joint intermediate section.

In the exterior panel structure for a vehicle according to the above aspect, the reinforcing surface of the reinforcing member may be formed of a resin material, the exterior panel material may be formed of a light alloy or the resin material, and the joint intermediate section may be formed of the light alloy.

In the exterior panel structure for a vehicle according to the above aspect, the exterior panel material is formed of the light alloy or the resin material, and the reinforcing member is formed of the resin material, which is advantageous for weight reduction of the exterior panel structure for a vehicle, that is, weight reduction of the vehicle.

In addition, in the exterior panel structure for a vehicle according to the above aspect, the joint intermediate section is formed of the light alloy, which is advantageous for processing the joint intermediate section into various shapes according to an inner surface shape of the exterior panel, a shape of the reinforcing outer peripheral edge of the reinforcing member, and the like. Furthermore, the joint intermediate section formed of the light alloy is advantageous for the weight reduction when compared to the joint intermediate section formed by using a ferrous material, for example.

In the exterior panel structure for a vehicle according to the above aspect, in the joint intermediate section, a first joint surface, a second joint surface, and a coupling surface may be formed integrally. The first joint surface is joined to the reinforcing outer peripheral edge of the reinforcing member. The second joint surface is joined to the panel outer peripheral edge of the exterior panel material. The coupling surface couples the first joint surface and the second joint surface.

In addition, in the exterior panel structure for a vehicle according to the above aspect, the coupling surface may be formed such that the first joint surface is separated from the inner surface of the exterior panel material in the thickness direction of the exterior panel material.

In the exterior panel structure for a vehicle according to the above aspect, the reinforcing outer peripheral edge of the reinforcing member and the first joint surface of the joint intermediate section are joined in a portion separated inward from the inner surface of the exterior panel material. Therefore, even when the outer surface of the exterior panel material is distorted by joining the reinforcing outer peripheral edge and the first joint surface, the distortion caused by such joining is less likely to affect the outer surface of the exterior panel material, and thus the outer surface of the exterior panel material can be prevented from becoming uneven.

In the exterior panel structure for a vehicle according to the above aspect, the panel outer peripheral edge of the exterior panel material and the second joint surface of the joint intermediate section may be joined by hemming.

In the exterior panel structure for a vehicle according to the above aspect, the panel outer peripheral edge of the exterior panel material and the second joint surface of the joint intermediate section are joined by hemming, which has conventionally been adopted for automobile production. Therefore, compared to a case where the panel outer peripheral edge of the exterior panel material and the second joint surface of the joint intermediate section are joined by using a special processing method, an increase in manufacturing cost can be prevented.

In the exterior panel structure for a vehicle according to the above aspect, when the reinforcing surface of the reinforcing member is seen in the thickness direction of the exterior panel material in plan view, the reinforcing member may be formed such that the three mutually-adjacent joint sections and the three coupling sections coupling these three joint sections form a triangle.

In the exterior panel structure for a vehicle according to the above aspect, the three mutually-adjacent joint sections and the three coupling sections coupling these three joint sections are coupled to form the triangle. Thus, while the simple configuration is adopted, it is possible to prevent deformation of the reinforcing surface in a direction along the inner surface of the exterior panel material, and the like. This is advantageous for preventing unevenness, which is caused by the distortion of the exterior panel material, by reinforcement using the reinforcing surface of the reinforcing member when the pressing force is applied to the exterior panel material during waxing of the vehicle, or the like.

In the exterior panel structure for a vehicle according to the above aspect, when the reinforcing surface of the reinforcing member is seen in the thickness direction of the exterior panel material in the plan view, the joint section may have a hexagonal external shape, and the coupling sections may be formed to extend radially in six directions from each of the joint sections.

In the exterior panel structure for a vehicle according to the above aspect, the coupling sections on the reinforcing surface of the reinforcing member are formed to extend radially in the six directions from the joint section. Therefore, the pressing force, which is applied to one of the six coupling sections from the exterior panel material during waxing of the vehicle, or the like, can be dispersed evenly from the joint section to the other coupling sections that are coupled to the respective joint section.

In the exterior panel structure for a vehicle according to the above aspect, the exterior panel material may be a door outer panel, in the case where the door outer panel is disposed to close a door opening of the vehicle, the reinforcing surface may be disposed in a region that overlaps the door opening, and the exterior panel structure may further include an inner panel that is disposed to cover the reinforcing member and is joined to the reinforcing outer peripheral edge when the exterior panel material is seen in the thickness direction of the exterior panel material in the plan view.

In the exterior panel structure for a vehicle according to the above aspect, the door outer panel is adopted as a specific example of the exterior panel material, and the inner panel is joined in the manner to cover and hide the reinforcing member on an inner side of a door. This is superior from a perspective of aesthetics since the reinforcing member is invisible from a cabin inner side in a closed state of the door.

In the exterior panel structure according to each of the above aspects, it is possible to prevent unevenness of the outer surface of the exterior panel material caused by joining of the reinforcing member, while joining the reinforcing member to the exterior panel material such that support rigidity is secured, and it is possible to keep dents in the exterior panel material small even when the user presses the exterior panel material during waxing of the vehicle, or the like.

BRIEF DESCRIPTION OF THE DRAWINGS

FIGS. 5A-5B include perspective views illustrating a section A in FIG. 4 in an enlarged manner, in which FIG. 5A is a view seen from the outside and FIG. 5B is a view seen from the inside.

FIGS. 8A-8B include cross-sectional views illustrating the door outer panel and a coupling section of the reinforcing member, in which FIG. 8A illustrates a state where a contact section of the coupling section is not in contact with the door outer panel and FIG. 8B illustrates a state where the contact section of the coupling section is in contact with the door outer panel.

DETAILED DESCRIPTION

Figure 1:
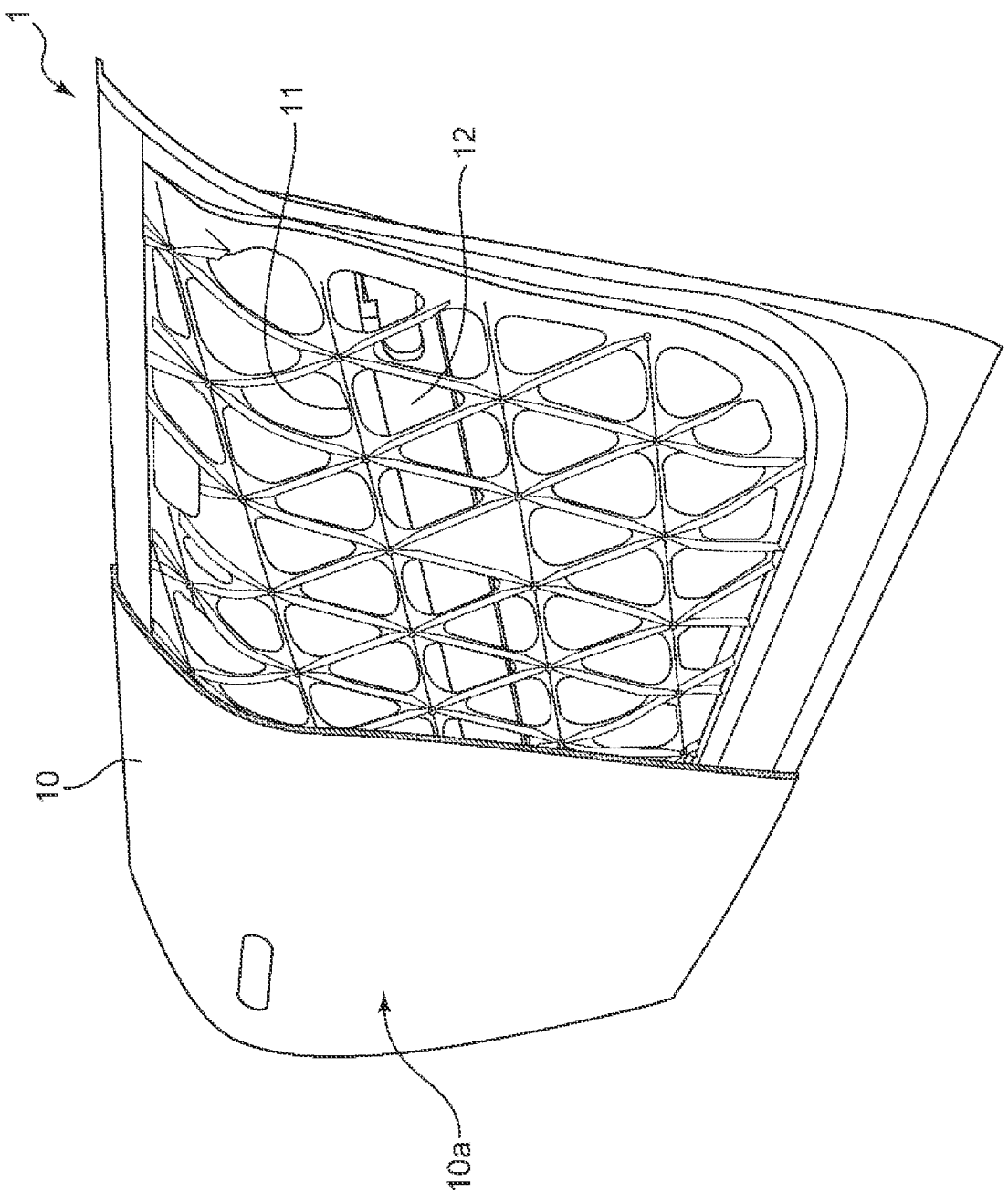
FIG. 1 is a perspective view in which a door according to an embodiment of the present disclosure is seen from the outside.

A description will hereinafter be made on an embodiment of the present disclosure with reference to the drawings. The embodiment, which will be described below, merely constitutes an example of the present disclosure, and the present disclosure is not limited to the following embodiment in any respect except for an essential configuration thereof.

1. Configuration of Door

In the embodiment of the present disclosure, a configuration that an exterior panel structure for a vehicle is applied to a door 1 is used as an example. Although not illustrated, the door 1 closes a door opening in a body in a closed state of the door 1. In addition, in the drawings used in the description below, a door inner panel that is provided on a cabin inner side of the door 1 is not illustrated.

A description will be made of a configuration of the door 1 with reference to FIG. 1 to FIG. 3. In FIG. 1, a part of a door outer panel (an exterior panel material) 10 as a component is not illustrated.

Figure 2:
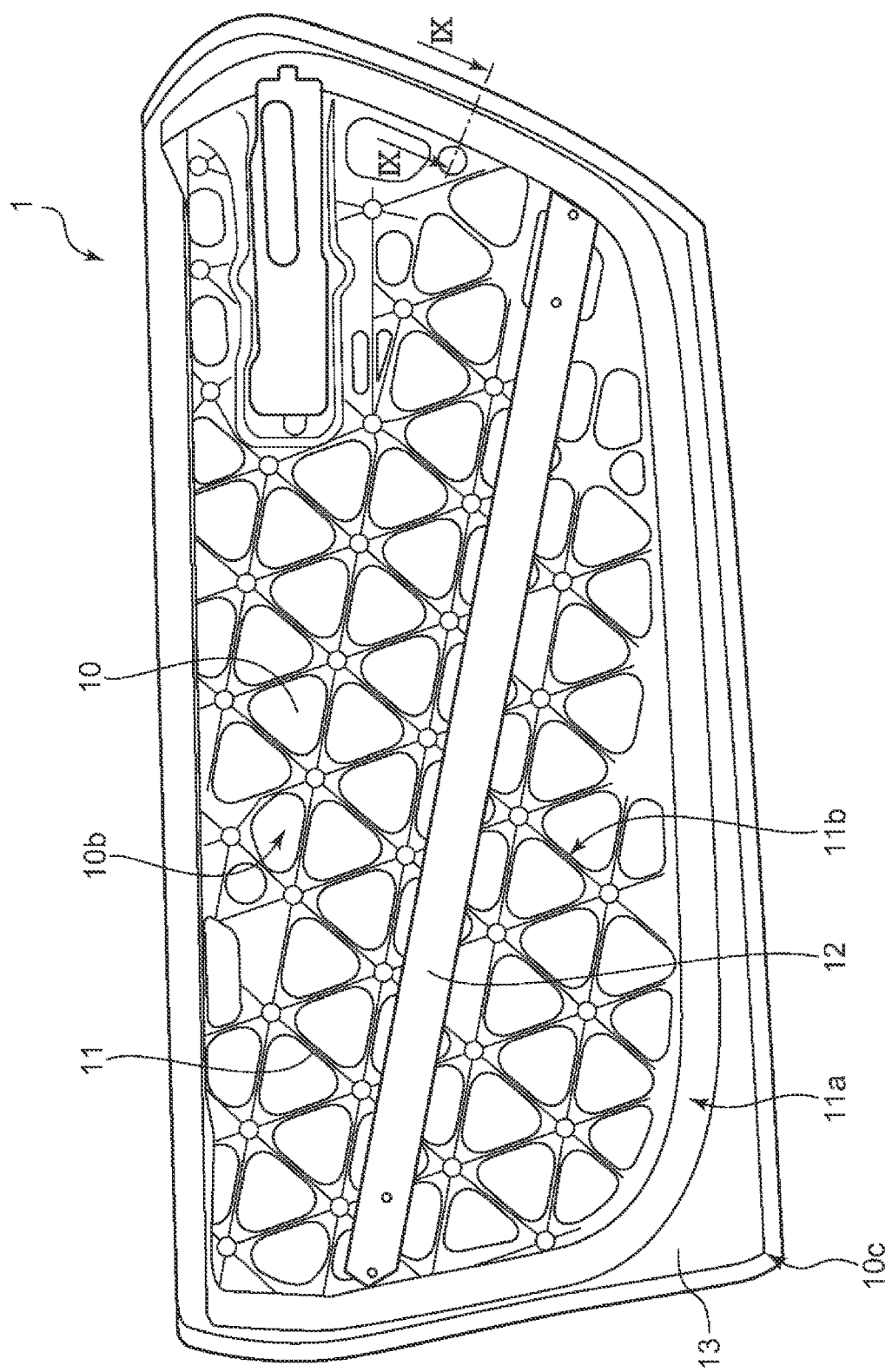
FIG. 2 is a plan view in which the door is seen from the inside.

As illustrated in FIG. 1 and FIG. 2, the door 1 includes the door outer panel (the exterior panel material) 10, a reinforcing member 11, a door impact bar 12, and a bracket (a joint intermediate section) 13. The door outer panel 10 has an outer surface 10a that partly constitutes external appearance of the vehicle. In this embodiment, the door outer panel 10 is formed of a light alloy (an aluminum alloy as an example). However, a resin material can also be adopted as a constituent material for the door outer panel 10.

In the reinforcing member 11, a frame-shaped reinforcing outer peripheral edge 11a and a reinforcing surface 11b are formed integrally, and the reinforcing surface 11b is provided on an inner side of the reinforcing outer peripheral edge 11a. The reinforcing surface 11b of the reinforcing member 11 is formed in a substantially meshed pattern when the reinforcing surface is seen in a thickness direction of the door outer panel 10 in plan view. As illustrated in FIG. 2, the reinforcing surface 11b of the reinforcing member 11 is formed along an entire inner surface 10b of the door outer panel 10 except for a portion in which a door handle is disposed. In this embodiment, the reinforcing member 11 is formed of the resin material.

As illustrated in FIG. 1 and FIG. 2, the door impact bar 12 is a long member and is formed to connect a front end and a rear end of the door 1 in a vehicle front-rear direction. Although not illustrated in detail, the door impact bar 12 is a member in a rectangular tube shape, and is formed of a metal material as an example. The door impact bar 12 is then disposed along the inner surface 10b of the door outer panel 10 with the reinforcing surface 11b of the reinforcing member 11 being interposed therebetween.

Figure 3:
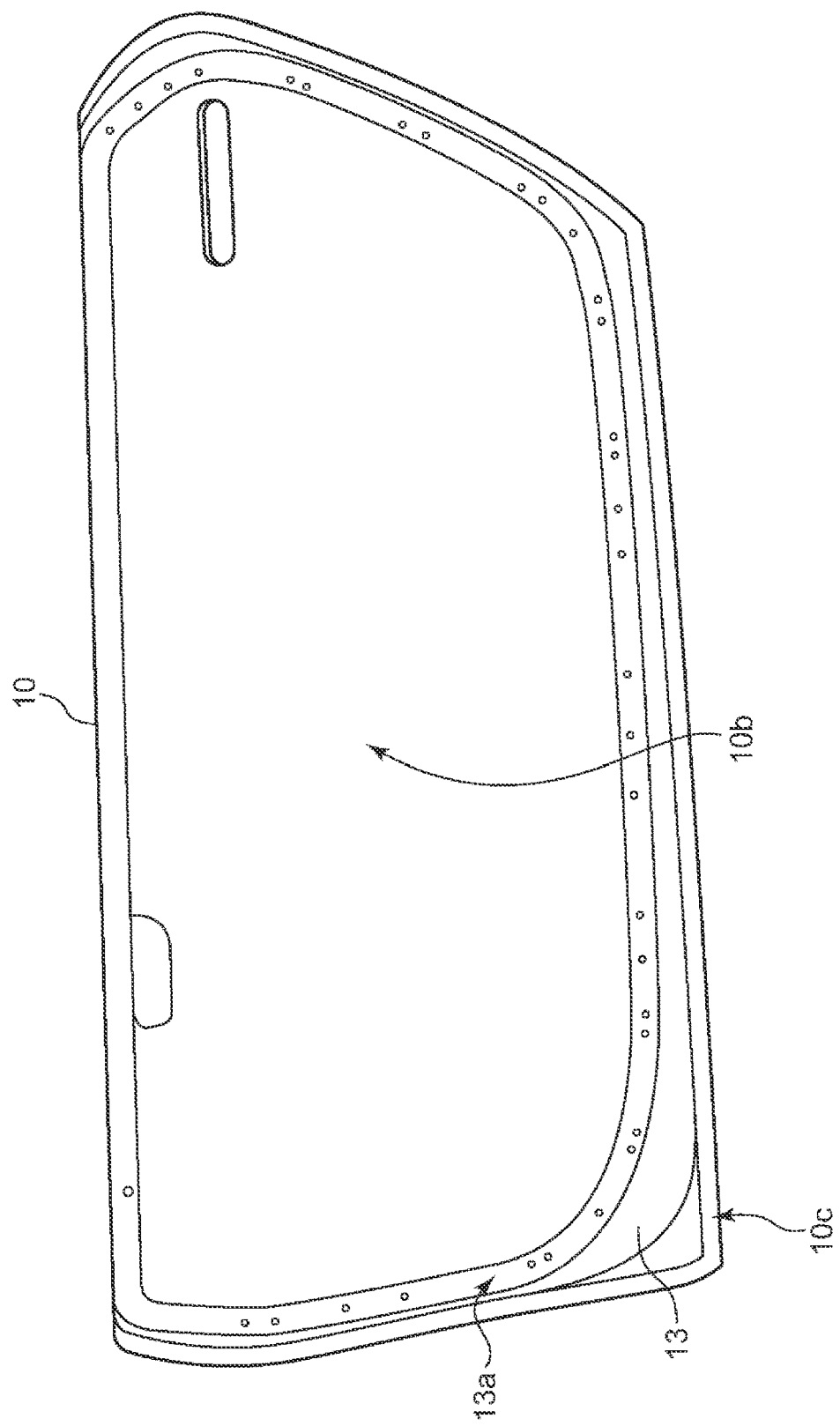
FIG. 3 is a plan view in which a door outer panel is seen from the inside.

As illustrated in FIG. 3, the bracket 13 is a frame-shaped member and is joined to a panel outer peripheral edge 10c of the inner surface 10b of the door outer panel 10. The reinforcing outer peripheral edge 11a of the reinforcing member 11, which is not illustrated in FIG. 3, is fixed to a first joint surface (a surface separated from the inner surface 10b of the door outer panel 10) 13a of the bracket 13.

In this embodiment, the bracket 13 is formed of a material that has a higher Young's modulus than the reinforcing surface 11b of the reinforcing member 11, and thus has higher rigidity than the reinforcing surface 11b of the reinforcing member 11. In this embodiment, for example, the light alloy (the aluminum alloy as an example) is adopted as a constituent material for the bracket 13. However, the resin material can also be adopted as the constituent material for the bracket 13. In this case, the bracket 13 has to be formed with the higher rigidity than the reinforcing surface 11b of the reinforcing member 11 by thickening the bracket 13 to be greater than the reinforcing surface 11b of the reinforcing member 11.

In this embodiment, the bracket 13 is formed as the separate member from the door outer panel 10 and the reinforcing member 11. However, the bracket 13 can also be formed integrally as a part of the door outer panel 10, and can also be formed integrally as a part of the reinforcing member 11.

2. Detailed Structure of Reinforcing Member

A description will be made on a detailed structure of the reinforcing member 11 with reference to FIG. 4 and FIGS. 5A-5B.

As described above, the reinforcing member 11 has: the reinforcing surface 11b that is formed in the substantially meshed pattern; and the reinforcing outer peripheral edge 11a that is formed to surround the reinforcing surface 11b. In the reinforcing member 11, the reinforcing outer peripheral edge 11a and the reinforcing surface 11b are formed integrally.

Figure 4:
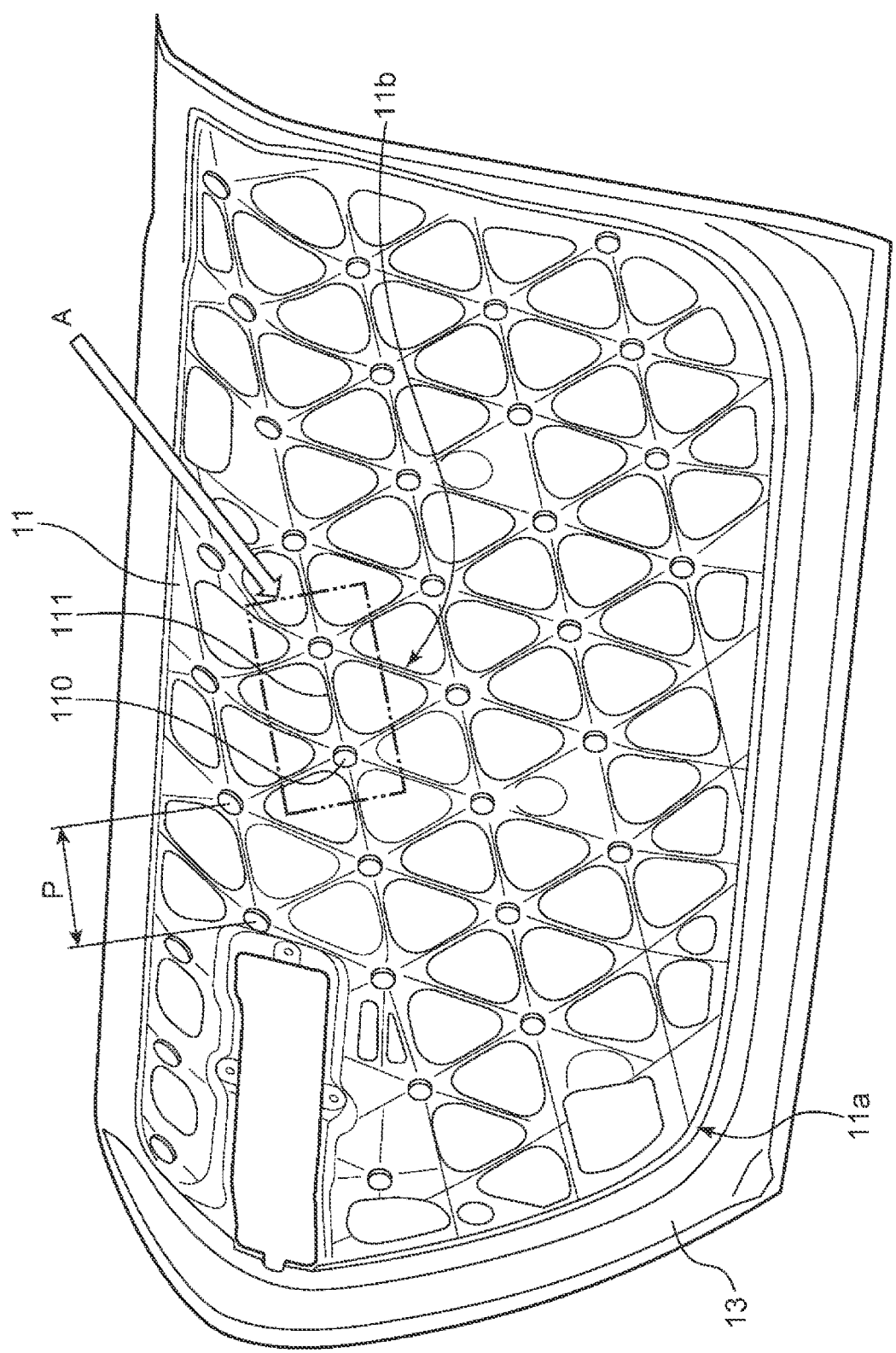
FIG. 4 is a perspective view illustrating a configuration of a reinforcing member.

As illustrated in FIG. 4, the reinforcing surface 11b of the reinforcing member 11 has plural joint sections 110 and plural coupling sections 111. The plural joint sections 110 and the plural coupling sections 111 are formed integrally. As illustrated in FIG. 5A, each of the joint sections 110 has a joint surface 110a that is joined to the inner surface 10b of the door outer panel 10. The joint surface 110a of the joint section 110 and the inner surface 10b of the door outer panel 10 are joined by adhesion as an example. As illustrated in FIGS. 5A and 5B, the joint section 110 has a substantially hexagonal external shape in the plan view.

Referring back to FIG. 4, the coupling section 111 couples the adjacent joint sections 110. In this embodiment, the plural joint sections 110 and the plural coupling sections 111 are disposed such that the three adjacent joint sections 110 and the three coupling sections 111 coupling these form a triangular planar shape. The six coupling sections 111 are coupled to the single joint section 110 in a manner to extend radially in six directions.

Figure 5A:
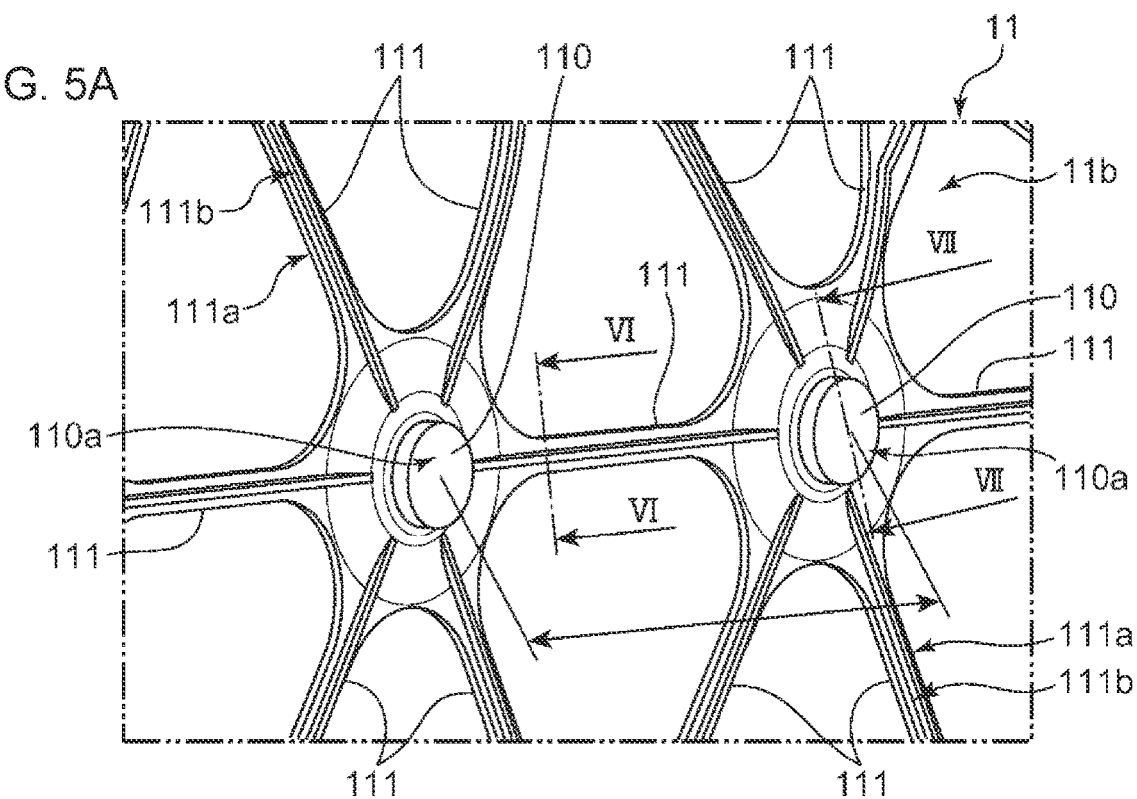

As illustrated in FIG. 5A, each of the coupling sections 111 has: a long base section 111a that extends along the inner surface 10b of the door outer panel 10; and a projected section 111b that is projected from the base section 111a toward the inner surface 10b of the door outer panel 10 and extends along the inner surface 10b of the door outer panel 10 in a similar manner to the base section 111a. As illustrated in FIG. 5B, each of the coupling sections 111 also has a projected section 111c that is projected from the base section 111a toward an opposite side of the inner surface 10b of the door outer panel 10 and extends along the inner surface 10b of the door outer panel 10 in the similar manner to the base section 111a. In each of the coupling sections 111, the base section 111a and the projected sections 111b, 111c are formed integrally.

Figure 5B:
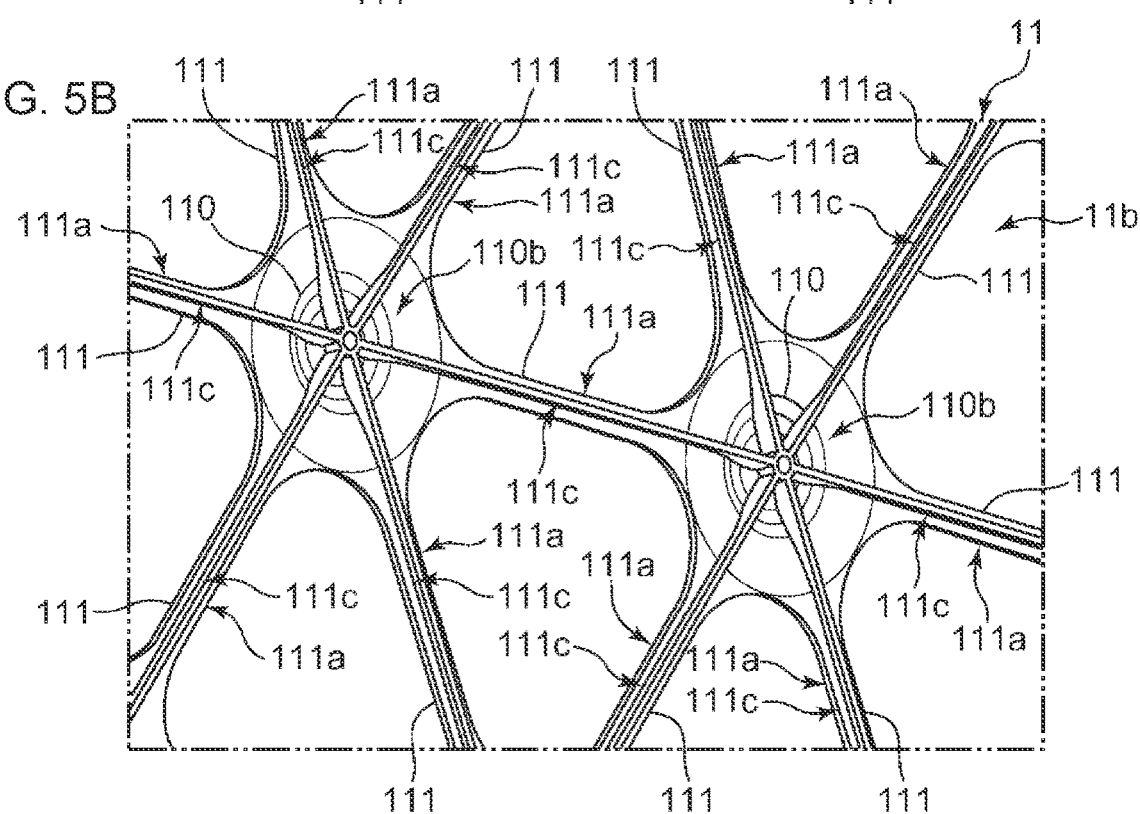

As illustrated in FIGS. 5A and 5B, the projected sections 111b, 111c in the coupling section 111 are formed to extend radially from the joint section 110. As illustrated in FIG. 5B, on a back surface 110b of the joint section 110 on an opposite side of the inner surface 10b of the door outer panel 10, the projected sections 111c of the six coupling sections 111, which are connected to the respective joint section 110, are connected to each other.

As illustrated in FIG. 4, in this embodiment, a distance P between the adjacent joint sections 110 is set within a range of 50 mm to 150 mm. This is set in consideration of the time of washing and waxing of the vehicle, and is within such a numerical range that is based on a user's palm size.

3. Arrangement of Joint Sections and Coupling Sections for Door Outer Panel

A description will be made on arrangement of the joint sections 110 and the coupling sections 111 for the door outer panel 10 with reference to FIG. 6 and FIG. 7.

As described above, in this embodiment, the coupling section 111 has the base section 111a and the projected sections 111b, 111c. Thus, as illustrated in FIG. 6, the coupling section 111 has a cross-sectional shape of a cross in a transverse plane. A lateral width of the coupling section 111 (a width of the base section 111a) is W1, and a lateral width of each of the projected sections 111b, 111c is W2. A height from an end (a contact section 111d) of the projected section 111b to an end of the projected section 111c is H1, and a height (a thickness) of the base section 111a is H2. W1 is 5 mm to 7 mm (6 mm as an example), and W2 is 1 mm to 2 mm (1.5 mm as an example). H1 is 4 mm to 5 mm (4.5 mm as an example), and H2 is 1 mm to 2 mm (1.5 mm as an example).

Figure 6:
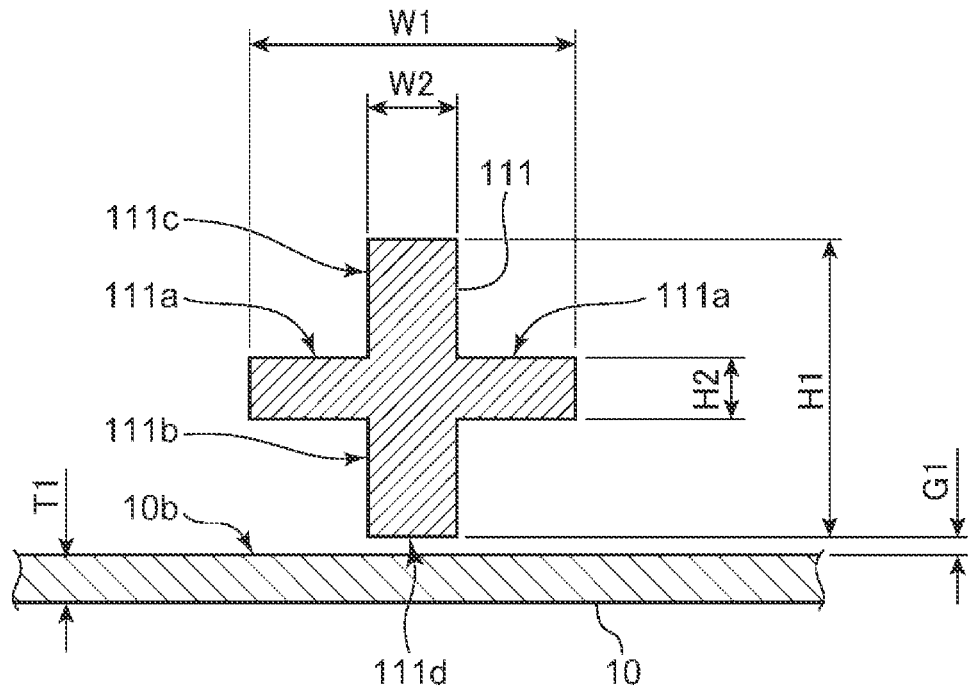
FIG. 6 is a cross-sectional view illustrating a cross section that is taken along line VI-VI in FIG. 5A.

As illustrated in FIG. 6, in the door 1 according to this embodiment, in a state where a pressing force is not applied to the door outer panel 10 from the outside, a gap G1 is provided between the inner surface 10b of the door outer panel 10 and the contact section 111d of the coupling section 111. The gap G1 is set to be equal to or shorter than five times a plate thickness T1 of the door outer panel 10. More specifically, the gap G1 is set within a range that exceeds 0 mm and is equal to or shorter than 3.0 mm. However, from a perspective of suppressing a dent in the door outer panel 10 to be small at the time when the pressing force is applied, the gap G1 is further preferably set to be equal to or shorter than twice the plate thickness T1 of the door outer panel 10.

Figure 7:
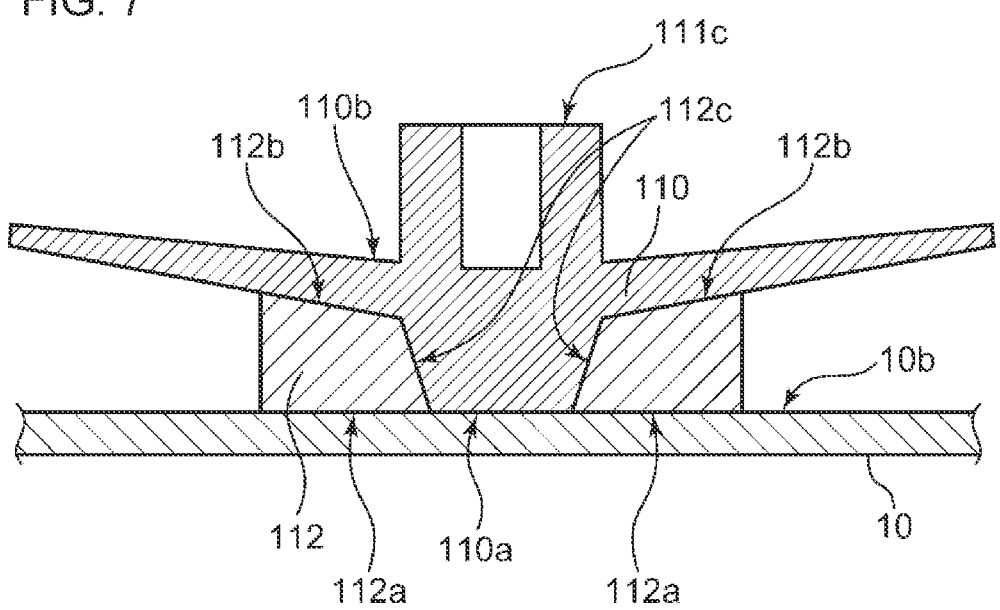
FIG. 7 is a cross-sectional view illustrating a cross section that is taken along line VII-VII in FIG. 5A.

As illustrated in FIG. 7, the joint surface 110a of the joint section 110 is joined to the inner surface 10b of the door outer panel 10. The joint surface 110a is joined to the inner surface 10b of the door outer panel 10 by an adhesion section 112. The adhesion section 112 is formed by solidifying an adhesive, and has an adhesive surface 112a to the inner surface 10b of the door outer panel 10 and adhesive surfaces 112b, 112c to the joint section 110. Regardless of presence or absence of the pressing force applied to the door outer panel 10 from the outside, the joint section 110 is joined to the inner surface 10b of the door outer panel 10.

As described above, on the back surface (the surface on the opposite side of the joint surface 110a) 110b of the joint section 110, the projected section 111c of the coupling section 111 connected thereto is formed extensively. On the back surface 110b of the joint section 110, the plural projected sections 111c are gathered in a cylindrical shape. On the back surface 110b of the joint section 110, the joint section 110 and the projected sections 111c of the coupling sections 111 are formed integrally.

4. State Change Between Door Outer Panel and Coupling Sections by Presence or Absence of Pressing Force A description will be made on a state change between the door outer panel 10 and the coupling sections 111 in the following cases with reference to FIGS. 8A-8B. The cases are: a case where the pressing force equal to or larger than a specified value is applied to the door outer panel 10 from the outside during washing and waxing of the vehicle by the user, and the like; and a case where the pressing force is not applied to the door outer panel 10 (a case where the pressing force is absent) or the smaller pressing force than the specified value is applied to the door outer panel 10.

Figure 8A:
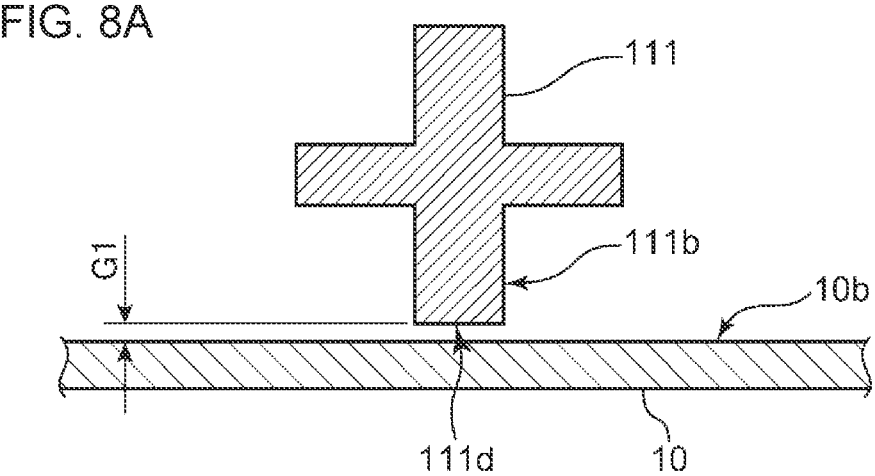

First, a description will be made on the case where the pressing force is not applied to the door outer panel 10 from the outside or the smaller pressing force than the specified value is applied to the door outer panel 10 with reference to FIG. 8A. As illustrated in FIG. 8A, in the case where the pressing force is not applied to the door outer panel 10 from the outside or the smaller pressing force than the specified value is applied to the door outer panel 10, the inner surface 10b of the door outer panel 10 and the contact section 111d of the coupling section 111 are separated from each other with the gap G1 being provided therebetween (a separated state).

Next, a description will be made on the case where the pressing force equal to or larger than the specified value is applied to the door outer panel 10 from the outside with reference to FIG. 8B. The "pressing force equal to or larger than the specified value" in this embodiment means a pressing force at the time when the user presses the door outer panel 10 with his/her palm during washing and waxing of the vehicle, and the like. More specifically, as the above "specified value", a value that is equal to or smaller than 100 N can be adopted, for example.

Figure 8B:
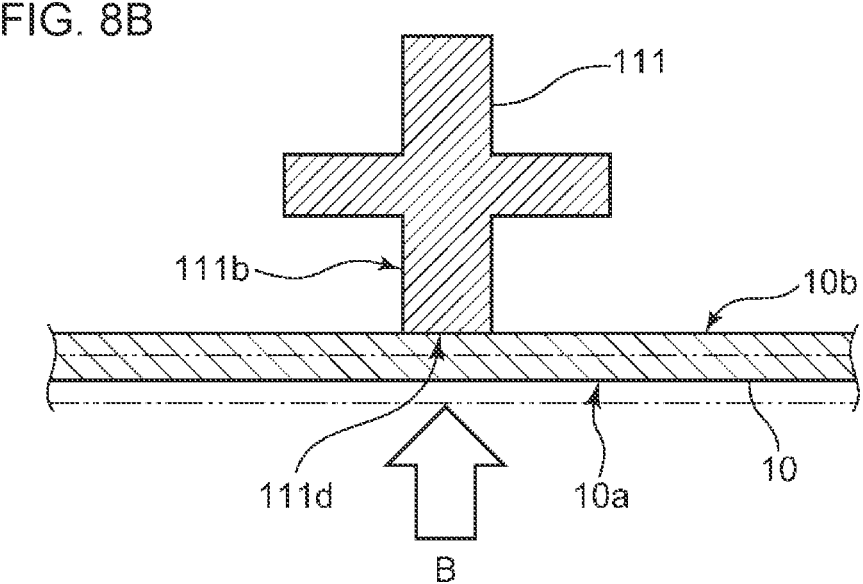

As illustrated in FIG. 8B, in the case where the pressing force equal to or larger than the specified value is applied to the door outer panel 10 from the outside (an arrow B), the door outer panel 10 is dented inward. Consequently, the inner surface 10b of the door outer panel 10 and the contact section 111d of the coupling section 111 abut each other (an abutment state). An amount of the dent in the door outer panel 10 is equal to an amount that is acquired by adding the gap G1 and an amount of deflection of the coupling section 111.

When the pressing force is no longer applied, the door outer panel 10 and the coupling section 111 return to the state illustrated in FIG. 8A due to elastic restoring forces thereof.

5. Joint Structure Between Door Outer Panel and Reinforcing Member

As described above, the reinforcing member 11 has the plural joint sections 110 on the reinforcing surface 11b, and the plural joint sections 110 are joined to the inner surface 10b of the door outer panel 10. However, the plural joint sections 110 are not joined to the door outer panel 10 in a state where support rigidity is secured only by joining the plural joint sections 110 to the inner surface 10b of the door outer panel 10. A description will be made on a joint structure with which the support rigidity is secured between the door outer panel 10 and the reinforcing member 11 with reference to FIG. 9.

Figure 9:
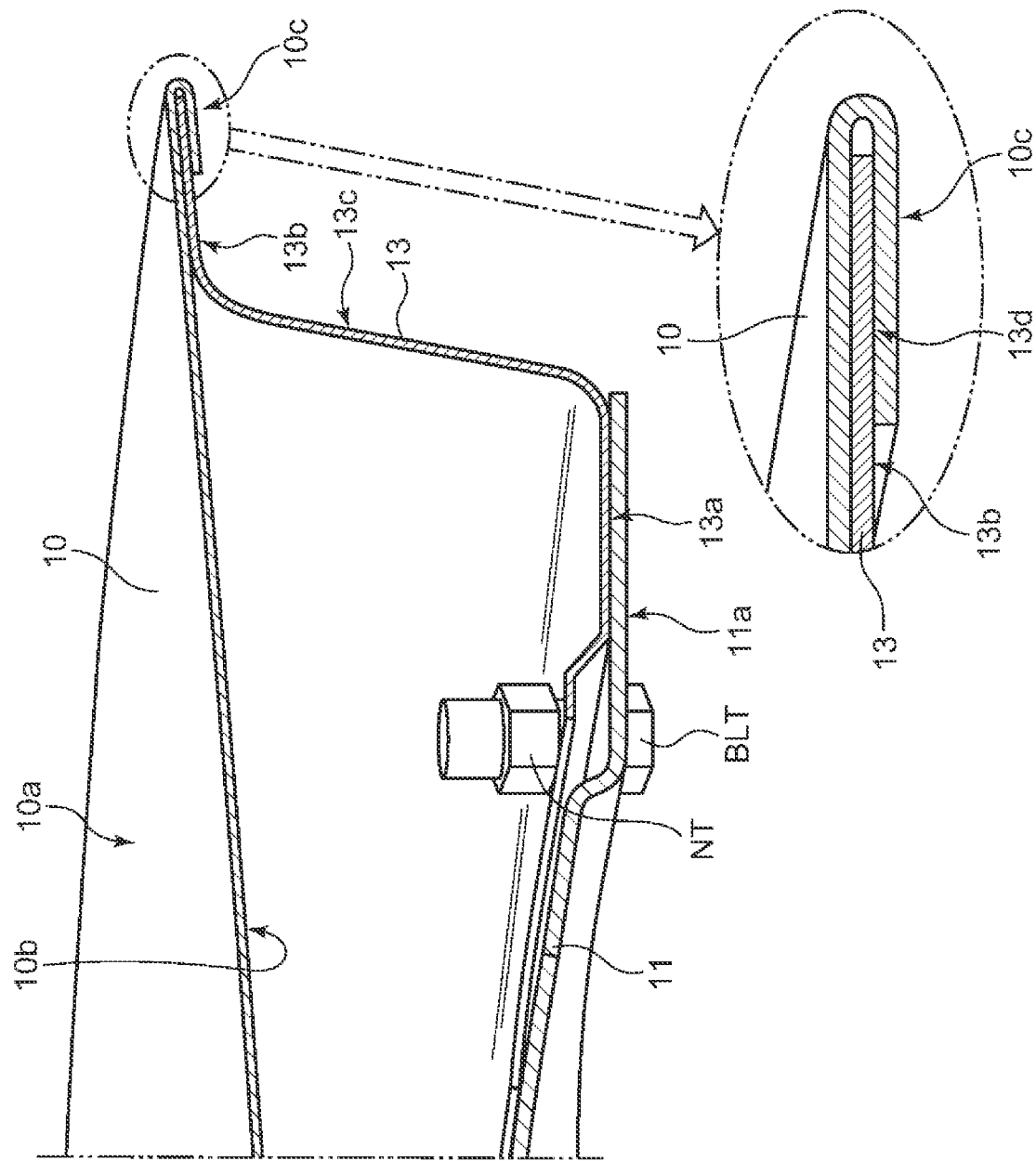
FIG. 9 is a cross-sectional view illustrating a cross section that is taken along line IX-IX in FIG. 2.

As illustrated in FIG. 9, the reinforcing outer peripheral edge 11a of the reinforcing member 11 is joined to the panel outer peripheral edge 10c that constitutes an outer peripheral edge of the door outer panel 10. In this way, the reinforcing member 11 is joined to the door outer panel 10 in the state of securing the support rigidity. The reinforcing member 11 and the door outer panel 10 are joined in a state where the bracket (the joint intermediate section) 13 being interposed therebetween.

The bracket 13 has a structure in which the first joint surface 13a, a second joint surface 13b, and a coupling surface 13c are integrally formed, and has a cross-sectional shape of a crank as a whole in a cross section illustrated in FIG. 9. The first joint surface 13a is a flat surface along the reinforcing outer peripheral edge 11a of the reinforcing member 11. The second joint surface 13b is a flat surface along the inner surface 10b of the door outer panel 10. The coupling surface 13c is connected to the first joint surface 13a and the second joint surface 13b, and the first joint surface 13a is formed to extend in a direction that crosses the inner surface 10b of the door outer panel 10 so as to be separated from the inner surface 10b of the door outer panel 10.

The first joint surface 13a of the bracket 13 and the reinforcing outer peripheral edge 11a of the reinforcing member 11 are joined to each other by fastening (mechanical fastening) a bolt BLT and a nut NT. However, the method for joining the first joint surface 13a of the bracket 13 and the reinforcing outer peripheral edge 11a of the reinforcing member 11 is not limited thereto. For example, the first joint surface 13a of the bracket 13 and the reinforcing outer peripheral edge 11a of the reinforcing member 11 can be joined by fastening using a rivet, can be joined by using the adhesive, or the like.

Meanwhile, the second joint surface 13b of the bracket 13 and the panel outer peripheral edge 10c of the door outer panel 10 are joined to each other by hemming As illustrated in an enlarged portion in FIG. 9, the panel outer peripheral edge 10c of the door outer panel 10 is bent in a manner to wrap an end edge 13d of the second joint surface 13b of the bracket 13. In this way, the second joint surface 13b of the bracket 13 and the panel outer peripheral edge 10c of the door outer panel 10 are joined.

In this embodiment, since the door outer panel 10 and the reinforcing member 11 are joined with the bracket 13 being interposed therebetween, the distortion caused by such joining is less likely to affect the outer surface 10a of the door outer panel 10. Therefore, it is possible to suppress the outer surface 10a of the door outer panel 10 from becoming uneven due to joining while joining the reinforcing member 11 to the door outer panel 10 in the state of securing the support rigidity.

Although not illustrated, in the door 1, an inner panel is joined in a manner to cover the reinforcing member 11, which is joined to the door outer panel 10 with the bracket 13 being held therebetween, from the inside. As a result, in a closed state of the door 1, the reinforcing member 11 is invisible from the inside of the cabin.

6. Effects

In the door (the exterior panel structure) 1 according to this embodiment, in the mutually separated state in the direction along the inner surface 10b of the door outer panel 10, the plural joint sections 110 on the reinforcing surface 11b of the reinforcing member 11 are joined to the inner surface 10b of the door outer panel 10. Meanwhile, the coupling sections 111 are not joined thereto. Accordingly, in the door 1, even in the case where the coupling sections 111 are not formed in a manner to accurately match a shape of the inner surface 10b of the door outer panel 10, the outer surface 10a of the door outer panel 10 is less likely to become uneven due to the distortion.

In the door 1, in the case where the pressing force equal to or larger than the specified value is applied, the coupling sections 111 on the reinforcing surface 11b of the reinforcing member 11 and the inner surface 10b of the door outer panel 10 abut each other. Accordingly, for example, even when the user presses the outer surface 10a of the door outer panel 10 with the pressing force equal to or larger than the specified value during waxing or washing of the vehicle, or the like, the coupling sections 111 on the reinforcing surface 11b of the reinforcing member 11 abut the inner surface 10b of the door outer panel 10, and thus a significant dent in the door outer panel 10 is prevented. For this reason, the door 1 is superior from a perspective of external appearance quality of the vehicle.

In the door 1 according to this embodiment, the panel outer peripheral edge 10c of the door outer panel 10 and the reinforcing outer peripheral edge 11a of the reinforcing member 11 are joined with the bracket (the joint intermediate section) 13 being interposed therebetween, and the bracket 13 is formed to have the higher rigidity than the reinforcing surface 11b of the reinforcing member 11. Accordingly, in the door 1, the reinforcing member 11 can be joined to the inner surface 10b of the door outer panel 10 with high support rigidity while the outer surface 10a of the door outer panel 10 is prevented from becoming uneven due to the distortion.

In the door 1 according to this embodiment, the bracket 13 is configured as the different component from the door outer panel 10 and the reinforcing member 11. Thus, the bracket 13 can easily be formed to have the high rigidity with respect to the reinforcing surface 11b of the reinforcing member 11, which is advantageous for joining the reinforcing member 11 to the inner surface 10b of the door outer panel 10 with high support rigidity.

In the door 1 according to this embodiment, the bracket 13 is formed by using the material (in this embodiment, the light alloy such as the aluminum alloy as an example) whose Young's modulus is at least higher than the reinforcing surface 11b. Thus, the reinforcing member 11 can be joined to the inner surface 10b of the door outer panel 10 with the high support rigidity without thickening the bracket 13.

In the door 1 according to this embodiment, the door outer panel 10 is formed of the light alloy such as the aluminum alloy, and the reinforcing member 11 is formed of the resin material, which is advantageous for weight reduction of the door 1, that is, weight reduction of the vehicle. However, the exterior panel material, which is exemplified by the door outer panel 10, can also be formed of the resin material.

In the door 1, the bracket 13 is formed of the light alloy such as the aluminum alloy, which is advantageous for processing the bracket 13 into various shapes according to the shape of the inner surface 10b of the door outer panel 10, a shape of the reinforcing outer peripheral edge 11a of the reinforcing member 11, and the like. In addition, the bracket 13 formed of the light alloy is advantageous for the weight reduction when compared to the bracket 13 formed by using a ferrous material, for example.

In the door 1 according to this embodiment, the reinforcing outer peripheral edge 11a of the reinforcing member 11 and the first joint surface 13a of the bracket 13 are joined in the portion separated inward (to the cabin inner side) from the inner surface 10b of the door outer panel 10. Thus, even when the outer surface 10a of the door outer panel 10 is distorted by joining the reinforcing outer peripheral edge 11a and the first joint surface 13a, the distortion caused by such joining is less likely to affect the outer surface 10a of the door outer panel 10, and thus the outer surface 10a of the door outer panel 10 can be prevented from becoming uneven.

In the door 1 according to this embodiment, the panel outer peripheral edge 10c of the door outer panel 10 and the second joint surface 13b of the bracket 13 are joined by hemming, which has conventionally been adopted for automobile production. Thus, compared to a case where the panel outer peripheral edge 10c of the door outer panel 10 and the second joint surface 13b of the bracket 13 are joined by using a special processing method, an increase in manufacturing cost can be avoided.

In the door 1 according to this embodiment, the three mutually-adjacent joint sections 110 and the three coupling sections 111 coupling these are coupled in the manner to form the triangular shape. Thus, it is possible to prevent deformation and the like of the reinforcing surface 11b in the direction along the inner surface 10b of the door outer panel 10 while adopting the simple configuration. This is advantageous for preventing unevenness, which is caused by the distortion of the door outer panel 10, by the reinforcement using the reinforcing surface 11b of the reinforcing member 11 when the pressing force equal to or larger than the specified value is applied to the door outer panel 10 during waxing of the vehicle, or the like.

In the door 1 according to this embodiment, the coupling sections 111 on the reinforcing surface 11b of the reinforcing member 11 are formed to extend radially in the six directions from the joint section 110. Thus, the pressing force, which is applied to one of the six coupling sections 111 from the door outer panel 10 during waxing of the vehicle, or the like, can be dispersed evenly from the joint section 110 to the other coupling sections 111 that are coupled to the respective joint section 110.

In the door 1 according to this embodiment, the inner panel, which is not illustrated, is joined in the manner to cover and hide the reinforcing member 11 on the inner side of the door 1. This is superior from a perspective of aesthetics since the reinforcing member 11 is invisible from the cabin inner side in the closed state of the door 1.

As it has been described so far, in the door (the exterior panel structure) 1 according to this embodiment, the reinforcing member 11 is joined to the door outer panel 10 with the bracket 13 being interposed therebetween. As a result, the outer surface 10a of the door outer panel 10 is prevented from becoming uneven due to joining of the reinforcing member 11 while the door outer panel 10 and the reinforcing member 11 are joined with the support rigidity being secured. In addition, even when the user presses the door outer panel 10 from the outside with the pressing force equal to or larger than the specified value during waxing of the vehicle, or the like, the dent in the door outer panel 10 can be kept small.

MODIFIED EXAMPLES

In the above embodiment, the reinforcing outer peripheral edge 11a and the reinforcing surface 11b are formed integrally in the reinforcing member 11. However, in the present disclosure, the reinforcing outer peripheral edge and the reinforcing surface do not always have to be formed integrally. As long as the reinforcing member can be joined to the door outer panel in the state where the support rigidity is secured, the reinforcing outer peripheral edge and the reinforcing surface can be configured as separate members.

In the above embodiment, the bracket 13 as the different member from the door outer panel 10 and the reinforcing member 11 is adopted as the example of the joint intermediate section. However, the present disclosure is not limited thereto. For example, the panel outer peripheral edge of the door outer panel can be extended and folded inward, so as to be used as the joint intermediate section. Alternatively, the reinforcing outer peripheral edge of the reinforcing member can be extended and made thicker than the reinforcing surface to constitute a portion having the high rigidity and be thereby used as the joint intermediate section.

In the above embodiment, the door outer panel 10 and the bracket 13 are joined by hemming, and the bracket 13 and the reinforcing member 11 are joined by fastening the bolt BLT and the nut NT. However, the present disclosure is not limited thereto. For example, welding or brazing can be adopted to join the door outer panel and the bracket, or riveting can be adopted for such joining. The bracket and the reinforcing member can also be joined by using the adhesive or by riveting.

In the above embodiment, the bracket 13, which is formed of the light alloy such as the aluminum alloy, is adopted. However, the material constituting the bracket is not limited thereto. For example, the bracket may be formed of the resin material. In particular, from a perspective of joining the reinforcing member to the door outer panel while securing the support rigidity, a fiber-reinforced resin (GFRP, CFRP, BFRP, AFRP, KFRP, ZFRP, or the like) is preferably adopted when the bracket is formed of the resin material.

In the above embodiment, the mode in which the reinforcing surface 11b of the reinforcing member 11 has the substantially meshed pattern in the plan view is used as the example. However, in the present disclosure, the reinforcing surface of the reinforcing member does not always have to have the substantially meshed pattern in the plan view. For example, such a mode in which the plural joint sections and the plural coupling sections form a linear shape can also be adopted. In addition, in regard to the arrangement mode of the plural joint sections, the plural joint sections do not always have to be dispersed at equally-spaced intervals, but can be arranged by changing density thereof by region according to an amount of the pressing force, which is expected in advance, on the exterior panel material.

In the above embodiment, the coupling section 111 on the reinforcing surface 11b of the reinforcing member 11 has the cross-sectional shape of the cross. However, the present disclosure is not limited thereto. For example, a coupling section having a circular cross-sectional shape, a coupling section having a toric cross-sectional shape, a coupling section having a polygonal cross-sectional shape, or the like can be adopted.

In the above embodiment, the joint section 110 on the reinforcing surface 11b of the reinforcing member 11 has the hexagonal shape in the plan view. However, the present disclosure is not limited thereto. For example, a joint section having a rectangular, octagonal, circular, or oval planar shape can be adopted.

In the above embodiment, the configuration that the six coupling sections 111 are connected to the single joint section 110 on the reinforcing surface 11b of the reinforcing member 11 is adopted. However, the present disclosure is not limited thereto. In consideration of load dispersion in the case where the pressing force is applied to the exterior panel material from the outside, the two or more coupling sections only need to be connected to the single joint section.

In the above embodiment, the "exterior panel structure for a vehicle" in the present disclosure is applied to the door 1, for which the door outer panel 10 as the example of the exterior panel material is adopted. However, in addition to the door 1, the present disclosure can also be applied to various portions such as a roof, a fender, and a hood of the vehicle.

What is claimed is:

1. An exterior panel structure for a vehicle comprising:
   an exterior panel having an outer surface that partly constitutes an external appearance of the vehicle; and
   a reinforcing member having a reinforcing surface that is disposed along an inner surface of the exterior panel and reinforces the exterior panel against a pressing force applied in a thickness direction of the exterior panel, wherein
   the reinforcing surface of the reinforcing member has:
      plural joint sections which are separated from each other along the inner surface of the exterior panel and each of which is joined to the inner surface of the exterior panel; and
      a first coupling section that extends to follow the inner surface of the exterior panel and couples two adjacent ones of the plural joint sections,
   the reinforcing member further has a reinforcing outer peripheral edge that is provided to an outer peripheral edge of the reinforcing surface to follow the inner surface of the exterior panel,
   the inner surface of the exterior panel and the first coupling section are configured to
      be separated from each other with a gap therebetween when the pressing force is not applied inward in the thickness direction of the exterior panel from the outer surface of the exterior panel or the applied pressing force is smaller than a specified value and
      abut each other when the pressing force is equal to or larger than the specified value and is applied inward in the thickness direction of the exterior panel from the outer surface of the exterior panel,
   the exterior panel structure further includes a joint intermediate section that is disposed between a panel outer peripheral edge on the inner surface of the exterior panel and the reinforcing outer peripheral edge of the reinforcing member and joins the panel outer peripheral edge and the reinforcing outer peripheral edge, and
   the joint intermediate section has a higher rigidity than the reinforcing surface of the reinforcing member.

2. The exterior panel structure for a vehicle according to claim 1, wherein
   the joint intermediate section is a different member from the exterior panel and the reinforcing member and is joined to each of the panel outer peripheral edge and the reinforcing outer peripheral edge.

3. The exterior panel structure for a vehicle according to claim 2, wherein
   the joint intermediate section comprises a material at least having a higher Young's modulus than the reinforcing surface of the reinforcing member.

4. The exterior panel structure for a vehicle according to claim 3, wherein
   the reinforcing surface of the reinforcing member comprises a resin material,
   the exterior panel comprises a light alloy or the resin material, and
   the joint intermediate section comprises the light alloy.

5. The exterior panel structure for a vehicle according to claim 4, wherein
   in the joint intermediate section, the following are formed integrally:
      a first joint surface that is joined to the reinforcing outer peripheral edge of the reinforcing member;

a second joint surface that is joined to the panel outer peripheral edge of the exterior panel; and a coupling surface that couples the first joint surface and the second joint surface, and the coupling surface is formed such that the first joint surface is separated from the inner surface of the exterior panel in the thickness direction of the exterior panel.

6. The exterior panel structure for a vehicle according to claim 5, wherein the panel outer peripheral edge of the exterior panel and the second joint surface of the joint intermediate section are joined by hemming.

7. The exterior panel structure for a vehicle according to claim 6, comprising a plurality of second coupling sections, each of which is identical to the first coupling section and extends to follow the inner surface of the exterior panel and couples two adjacent ones of the plural joint sections, wherein when the reinforcing surface of the reinforcing member is seen in the thickness direction of the exterior panel in plan view, the reinforcing member is formed such that three mutually-adjacent ones of the plural joint sections and three of the plurality of second coupling sections coupling these three joint sections form a triangle.

8. The exterior panel structure for a vehicle according to claim 7, wherein when the reinforcing surface of the reinforcing member is seen in the thickness direction of the exterior panel in the plan view, the joint sections each have a hexagonal external shape, and six of the plurality of second coupling sections extend radially in six directions from each of the joint sections.

9. The exterior panel structure for a vehicle according to claim 8, wherein the exterior panel is a door outer panel, when the door outer panel is disposed to close a door opening of the vehicle, the reinforcing surface is disposed in a region that overlaps the door opening, and the exterior panel further includes an inner panel that is disposed to cover the reinforcing member and is joined to the reinforcing outer peripheral edge when the exterior panel is seen in the thickness direction of the exterior panel in the plan view.

10. The exterior panel structure for a vehicle according to claim 2, wherein the reinforcing surface of the reinforcing member comprises a resin material, the exterior panel comprises a light alloy or the resin material, and the joint intermediate section comprises the light alloy.

11. The exterior panel structure for a vehicle according to claim 2, wherein in the joint intermediate section, the following are formed integrally:

a first joint surface that is joined to the reinforcing outer peripheral edge of the reinforcing member;

a second joint surface that is joined to the panel outer peripheral edge of the exterior panel; and a coupling surface that couples the first joint surface and the second joint surface, and the coupling surface is formed such that the first joint surface is separated from the inner surface of the exterior panel in the thickness direction of the exterior panel.

12. The exterior panel structure for a vehicle according to claim 3, wherein in the joint intermediate section, the following are formed integrally:

a first joint surface that is joined to the reinforcing outer peripheral edge of the reinforcing member;

a second joint surface that is joined to the panel outer peripheral edge of the exterior panel; and a coupling surface that couples the first joint surface and the second joint surface, and the coupling surface is formed such that the first joint surface is separated from the inner surface of the exterior panel in the thickness direction of the exterior panel.

13. The exterior panel structure for a vehicle according to claim 10, wherein in the joint intermediate section, the following are formed integrally:

a first joint surface that is joined to the reinforcing outer peripheral edge of the reinforcing member;

a second joint surface that is joined to the panel outer peripheral edge of the exterior panel; and a coupling surface that couples the first joint surface and the second joint surface, and the coupling surface is formed such that the first joint surface is separated from the inner surface of the exterior panel in the thickness direction of the exterior panel.

14. The exterior panel structure for a vehicle according to claim 11, wherein the panel outer peripheral edge of the exterior panel and the second joint surface of the joint intermediate section are joined by hemming.

15. The exterior panel structure for a vehicle according to claim 1, comprising a plurality of second coupling sections, each of which is identical to the first coupling section and extends to follow the inner surface of the exterior panel and couples two adjacent ones of the plural joint sections, wherein when the reinforcing surface of the reinforcing member is seen in the thickness direction of the exterior panel in plan view, the reinforcing member is formed such that three mutually-adjacent ones of the plural joint sections and three of the plurality of second coupling sections coupling these three joint sections form a triangle.

16. The exterior panel structure for a vehicle according to claim 2, comprising a plurality of second coupling sections, each of which is identical to the first coupling section and extends to follow the inner surface of the exterior panel and couples two adjacent ones of the plural joint sections, wherein when the reinforcing surface of the reinforcing member is seen in the thickness direction of the exterior panel in plan view, the reinforcing member is formed such that three mutually-adjacent ones of the plural joint sections and three of the plurality of second coupling sections coupling these three joint sections form a triangle.

17. The exterior panel structure for a vehicle according to claim 1, comprising a plurality of second coupling sections, each of which is identical to the first coupling section and extends to follow the inner surface of the exterior panel and couples two adjacent ones of the plural joint sections, wherein when the reinforcing surface of the reinforcing member is seen in the thickness direction of the exterior panel in the plan view, the joint sections each have a hexagonal external shape, and six of the plurality of second coupling sections extend radially in six directions from each of the joint sections.

18. The exterior panel structure for a vehicle according to claim 15, wherein when the reinforcing surface of the reinforcing member is seen in the thickness direction of the exterior panel in the plan view, the joint sections each have a hexagonal external shape, and six of the plurality of second coupling sections extend radially in six directions from each of the joint sections.

19. The exterior panel structure for a vehicle according to claim 1, wherein the exterior panel is a door outer panel, when the door outer panel is disposed to close a door opening of the vehicle, the reinforcing surface is disposed in a region that overlaps the door opening, and the exterior panel further includes an inner panel that is disposed to cover the reinforcing member and is joined to the reinforcing outer peripheral edge when the exterior panel is seen in the thickness direction of the exterior panel in the plan view.

20. The exterior panel structure for a vehicle according to claim 11, wherein the exterior panel is a door outer panel, when the door outer panel is disposed to close a door opening of the vehicle, the reinforcing surface is disposed in a region that overlaps the door opening, and the exterior panel further includes an inner panel that is disposed to cover the reinforcing member and is joined to the reinforcing outer peripheral edge when the exterior panel is seen in the thickness direction of the exterior panel in the plan view.

\* \* \* \* \*